United States Patent [19]

Skaife

[11] 4,213,274
[45] Jul. 22, 1980

[54] AERATED CONTINUOUSLY WATERED PLANT AND SEED ORGANIC GROWING MEDIUM AND CONTAINER FOR SAME

[75] Inventor: William A. Skaife, Dubuque, Iowa

[73] Assignee: Vivian A. Skaife, Irrevocable Trust, Dubuque, Iowa; Margaret R. Skaife, Trustee

[21] Appl. No.: 863,086

[22] Filed: Dec. 22, 1977

Related U.S. Application Data

[63] Continuation of Ser. No. 704,190, Jul. 12, 1976, abandoned, which is a continuation-in-part of Ser. No. 693,637, Jun. 7, 1976, abandoned, which is a continuation of Ser. No. 577,863, May 15, 1970, Pat. No. 3,961,444.

[51] Int. Cl.² ............................................. A01G 27/00
[52] U.S. Cl. ............................................. 47/81; 47/86
[58] Field of Search ..................................... 47/77–81, 47/85, 86, 71, 66

[56] References Cited

U.S. PATENT DOCUMENTS

| | | | |
|---|---|---|---|
| 195,094 | 9/1877 | Crowther | 47/79 |
| 195,580 | 9/1877 | Crater | 47/80 |
| 576,850 | 2/1897 | Iken | 47/80 |
| 954,440 | 4/1910 | Klemm | 47/79 |
| 1,912,914 | 6/1933 | O'Brien | 47/79 |
| 3,058,263 | 10/1962 | Reynolds | 47/80 |
| 4,083,146 | 4/1978 | Brankovic | 47/71 |

FOREIGN PATENT DOCUMENTS

| | | | |
|---|---|---|---|
| 830581 | 2/1952 | Fed. Rep. of Germany | 47/71 |
| 1414605 | 9/1965 | France | 47/80 |
| 1470367 | 2/1967 | France | 47/79 |
| 255727 | 11/1927 | Italy | 47/78 |
| 455065 | 2/1950 | Italy | 47/80 |
| 299 | of 1885 | United Kingdom | 47/66 |
| 288141 | 9/1928 | United Kingdom | 47/79 |

Primary Examiner—E. H. Eickholt
Attorney, Agent, or Firm—Zarley, McKee, Thomte, Voorhees & Sease

[57] ABSTRACT

An organic growing medium for plants or seeds placed in standing water is exposed to humid air over its substantial outer side surface thereby making air available to plant roots. The growing medium may be in a pot having porous sidewalls which allows air to be admitted into the pot or air openings may be formed in the pot sidewalls. The pot may further sit in a container wherein an air passageway is formed between the container and the pot to provide humid air around the growing medium. Alternatively, the growing medium may be spaced from the container wall having air openings and an air chamber is formed between the growing medium and the container wall. A plant or seed may be placed in a growing medium centrally located of alternate air chambers and growing mediums formed by pairs of spaced apart walls having air openings therein allowing air to communicate to the growing medium and to allow the plant roots to grow from one growing medium into an air chamber and thence into the next growing medium. A further alternate embodiment includes a wall assembly in the growing medium including spaced apart walls forming an air chamber with a bottom channel wall for holding water for providing humid air and moisture to the adjacent plant roots through the perforated walls.

5 Claims, 23 Drawing Figures

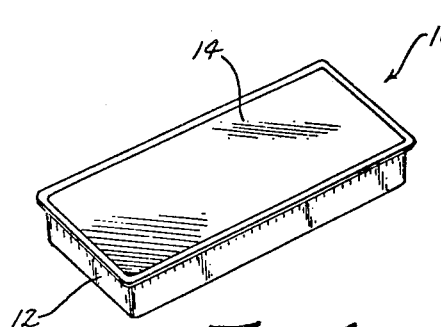
Fig. 1
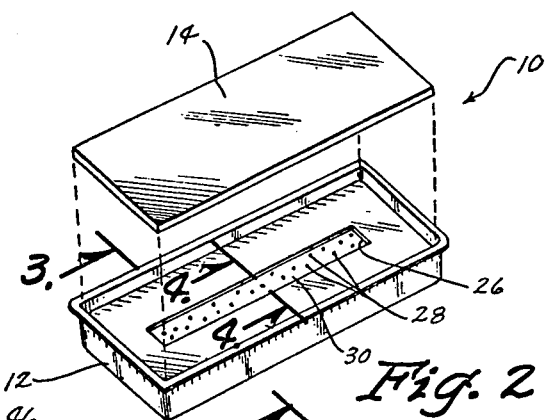
Fig. 2
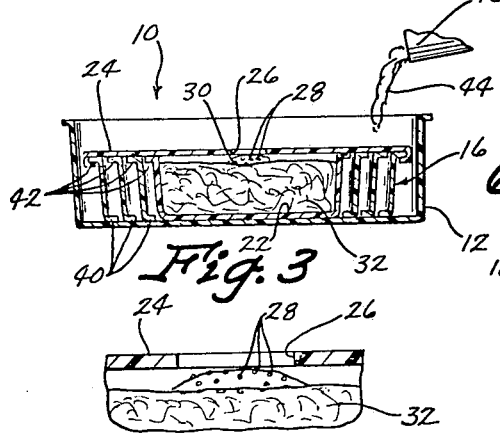
Fig. 3
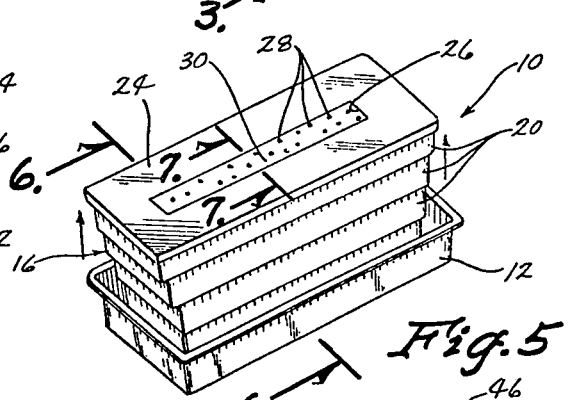
Fig. 5
Fig. 4
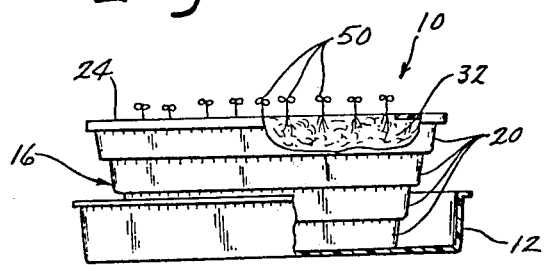
Fig. 8
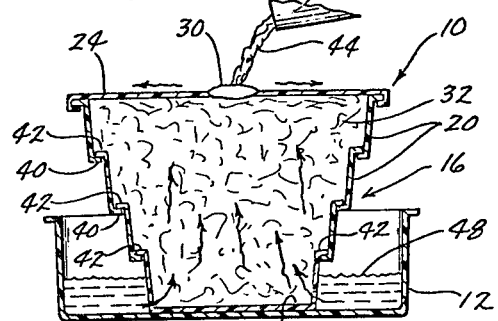
Fig. 6
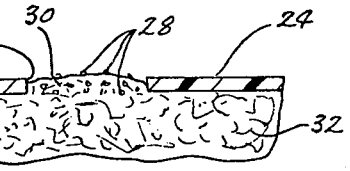
Fig. 7
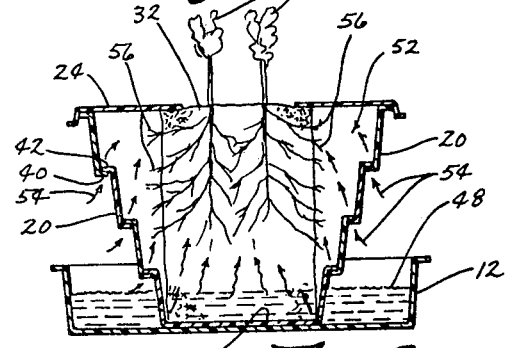
Fig. 9

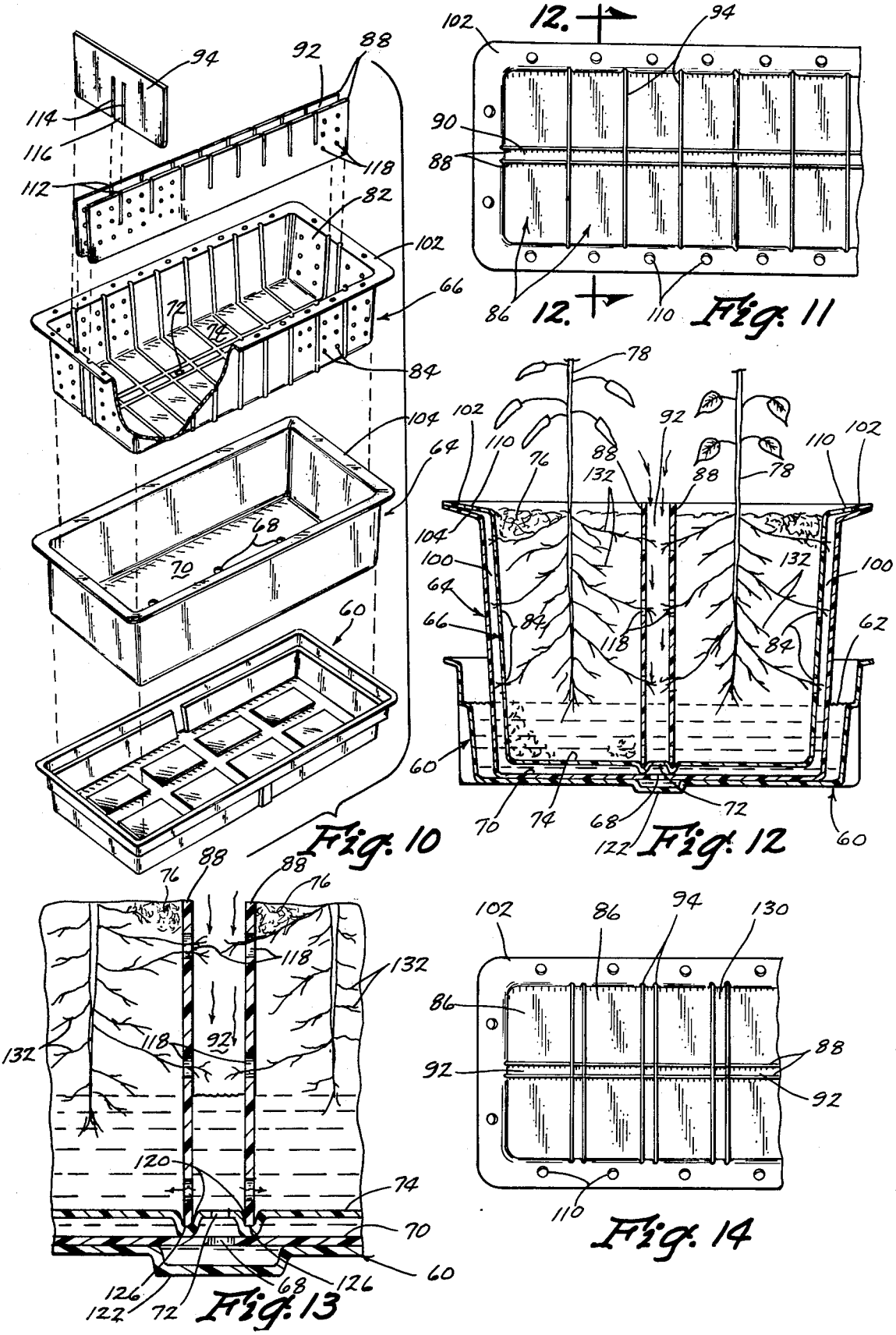

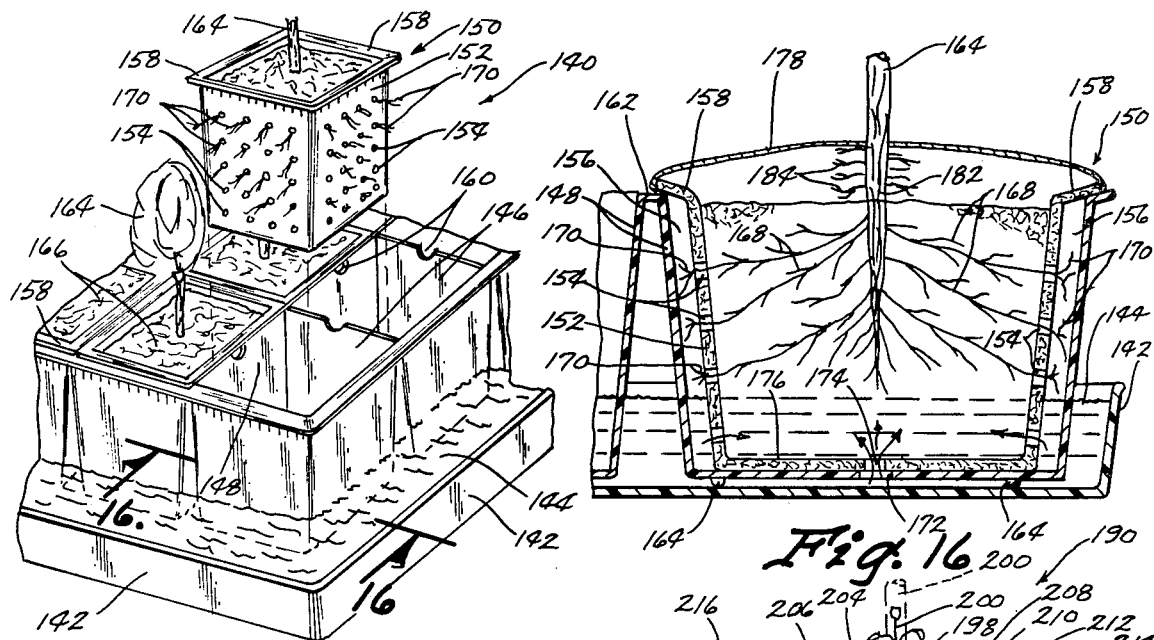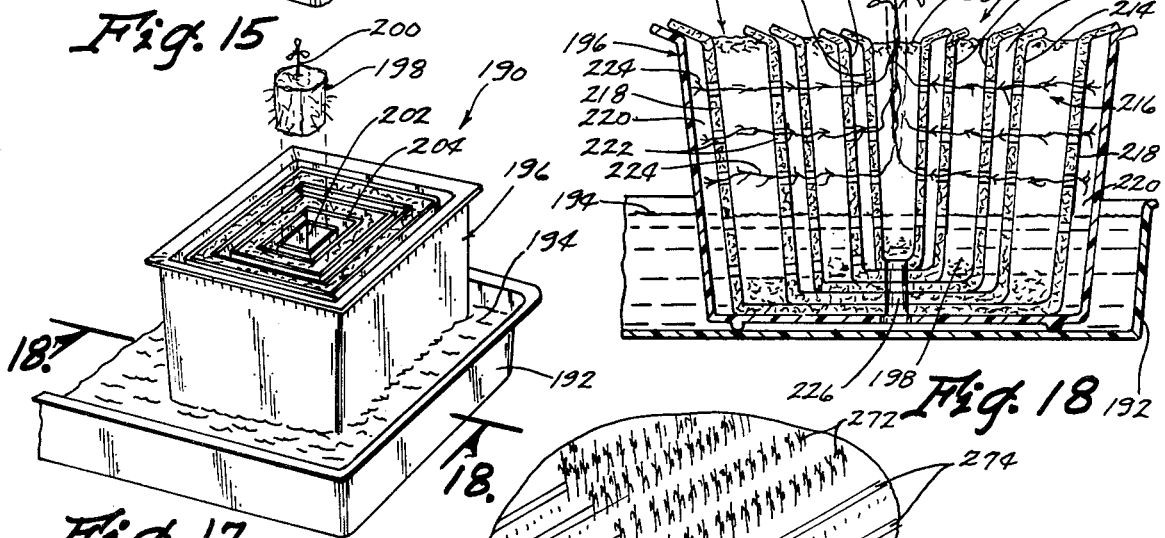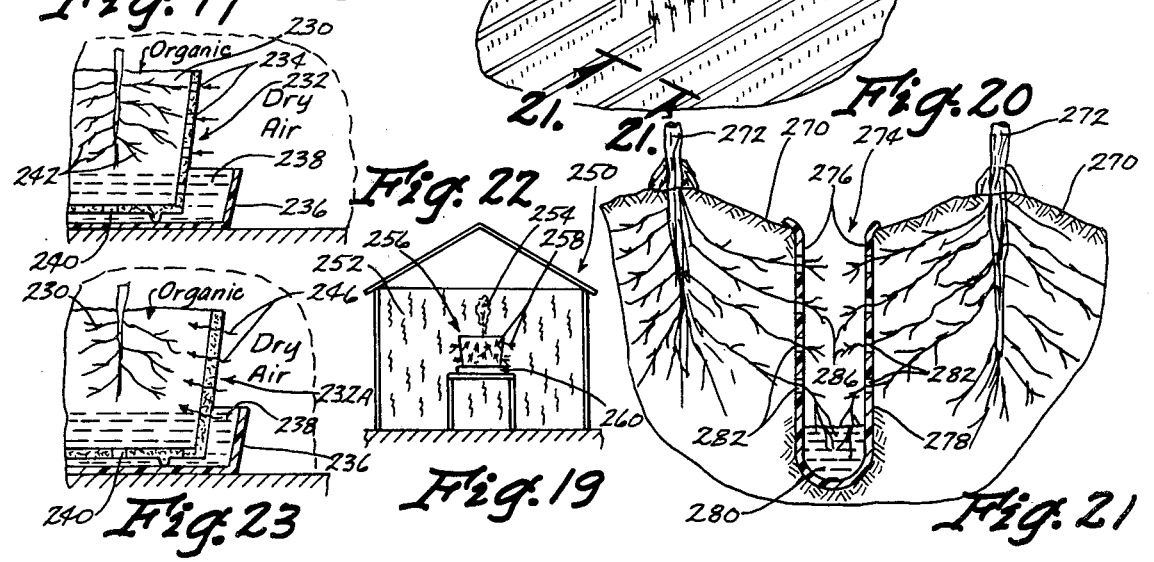

AERATED CONTINUOUSLY WATERED PLANT AND SEED ORGANIC GROWING MEDIUM AND CONTAINER FOR SAME

This is a continuation application of Ser. No. 704,190, July 12, 1976 now abandoned, which is a continuation-in-part application of Ser. No. 693,637, filed June 7, 1976 now abandoned, which is a continuation of Ser. No. 577,863, filed May 15, 1975 which issued as U.S. Pat. No. 3,961,444, June 8, 1976.

BACKGROUND OF THE INVENTION

A common problem in growing plants is if they are overwatered they can be injured or killed. Furthermore, plants can become "root bound" and stop growing until they are transplanted into a larger container. The supplying of nutrients to the growing medium can also be a problem in terms of supplying the correct nutrients and in the right amounts.

Applicant's U.S. Pat. No. 3,961,444 disclosed compressed peat moss in a container having telescoping sections which would expand upon the compressed peat moss being subjected to moisture. The expandable telescopic container allowed air to enter through the section connections and thus aerated the expanded peat moss. It was learned through usage that this particular pot, unlike other pots heretofore known, could maintain a growing plant while being continuously watered by the pot being maintained in standing water. Further study indicated that continuous watering was possible due to the fact that the growing medium and the roots of the plant were receiving air that neutralized the normally negative effects of over watering. A humidity chamber existed between the expanded peat moss and the sidewalls of the telescopic container sections and the roots of the plant would grow into this humidity chamber. It became apparent that the roots were then receiving nourishment from the nutrients in the air since the plants generally thrived in these growing conditions.

SUMMARY OF THE INVENTION

This invention involves a method of growing all seed and plants together at the same time and containers for these plants which allow them to grow while a substantial portion of the growing medium is immersed in standing water thereby through capillary action allowing the growing medium to take on as much water as it will naturally hold which substantially saturates the growing medium and maintains it in a saturated condition. The growing medium is aerated around its exterior surfaces and thereby allows humid fresh air to circulate throughout the porous growing medium and to the plant roots.

Specifically, air is allowed to reach the growing medium which is preferably organic material by the pot material being formed from very porous material such as peat which allows air to pass through the sidewalls of the container. Alternatively, air holes may be provided in the substantial area of the container wall. In some instances, the expanded peat moss does not require a container to hold the growing medium together and in that case the container is spaced from the sides of the peat thereby forming a humid air chamber surrounding the peat. The air chamber gains its humidity from the moist peat which is in the standing water. A humidity chamber may also be provided by placing a plant in a container having air holes in turn maintained in a greenhouse having a humid atmosphere.

The proximity of the air to the growing medium and plant roots depends on the porosity of the growing medium and the container walls, if any, and the plant but in general a container may be provided that includes alternately a growing medium with the plant in the center and rings of air chambers and growing mediums encircling the centrally located plant with the walls forming the air chambers and growing medium chambers being supplied with air openings for communication of the air and for the roots to grow from one growing medium to the next through the air chamber. Any number of rings of air chambers and growing mediums may be provided such that the plant would be able to grow indefinitely without being transplanted if the container is large enough.

A number of pots may be made up by providing a plurality of transversely extending walls in a larger pot assembly having apertured sidewalls for communication with an air chamber. The transversely extending walls may be in parallel spaced apart pairs to provide air chambers along at least some of the sides of the smaller pots. Also, a container may have a plurality of side-by-side chambers which receive individual pots having apertured sidewalls which provide communication between the growing medium and the air chamber between the container walls and the apertured pot walls.

The aeration concept may also be applied to field growing of plants by the provision of spaced apart air chamber in the growing medium adjacent growing plants and the air chamber may include standing water in the bottom thereof. The chamber sidewalls are apertured to allow humid air to reach the soil growing medium and to allow the roots to reach the air chamber and the water supply in the bottom thereof.

Each of the embodiments of this invention illustrate that plants cannot be overwatered if aeration of the organic growing medium is maintained and the plant's growth will not be stunted or terminated by becoming "root bound" and thus have to be transplanted. The only reason for transplanting would be if the plant required a larger base to support the increased plant size. The growing medium is maintained in direct communication with an unregulated water supply and preferably a substantial portion is immersed in the water such that the growing medium can through capillary action take on as much water as it will naturally hold thereby substantially saturating the growing medium and maintaining the growing medium in a substantially saturated condition adapted for providing fresh humidified air to seed or plant roots in the growing medium.

DESCRIPTION OF THE DRAWINGS

FIG. 1 is a perspective view of the collapsed container containing compressed peat moss.

FIG. 2 is an exploded view similar to FIG. 1 but showing the shipping cover removed.

FIG. 3 is a cross-sectional view taken along line 3—3 in FIG. 2.

FIG. 4 is an enlarged fragmentary view taken along line 4—4 in FIG. 2.

FIG. 5 is a perspective view showing the container in its expanded condition.

FIG. 6 is a cross-sectional view taken along line 6—6 in FIG. 5 and showing water being applied to the peat moss and soluble wax containing the seeds.

FIG. 7 is a cross-sectional view taken along line 7—7 in FIG. 6.

FIG. 8 is a fragmentary view of the container showing plants that have grown from the seeds.

FIG. 9 is a cross-sectional view similar to FIG. 6 but showing the plant after root growth has occurred wherein the roots are feeding on humid air in the humidity chamber between the container sidewalls and the growing medium.

FIG. 10 is an exploded fragmentary perspective view of the container having a pot assembly with apertured sidewalls and transversely extending walls defining individual plant pots and air chambers.

FIG. 11 is a fragmentary top plan view thereof.

FIG. 12 is a cross-sectional view taken along line 12—12 in FIG. 11.

FIG. 13 is an enlarged cross-sectional view similar to FIG. 12.

FIG. 14 is a modified embodiment of that shown in FIGS. 10-13 wherein an air chamber is provided on all sides of the individual pots by the transversely extending walls being in pairs and spaced apart.

FIG. 15 is an alternate embodiment of this invention wherein a container includes a plurality of chambers which receive individual pots having air holes in the sidewalls for transmission of air from an air chamber to the growing medium and for the roots to grow into the air chamber.

FIG. 16 is a cross-sectional view taken along line 16—16 in FIG. 15.

FIG. 17 is a further alternate embodiment wherein a plurality of concentric alternating growing mediums and air chambers are provided for plants as they grow in size such that their roots are always in communication with humid air.

FIG. 18 is a cross-sectional view taken along line 18—18 in FIG. 17.

FIG. 19 is a side elevation view of a hothouse functioning as a humid air chamber around an aerated potted plant.

FIG. 20 is a fragmentary perspective view of a field growing medium having spaced apart air chambers formed by channel walls with water being held in the bottom of the air chamber for providing air and moisture to the plant roots.

FIG. 21 is a cross sectional view taken along line 21—21 in FIG. 20.

FIG. 22 is a cross sectional elevational view of a plant in an aerated container being continuously watered and exposed to dry air.

FIG. 23 is a view similar to FIG. 22 but showing the container of a naturally porous material having air transmission capability.

DESCRIPTION OF THE PREFERRED EMBODIMENT

The flower box of FIGS. 1-8 is referred to generally in FIG. 1 by the reference numeral 10 and includes a container 12 rectangular in shape open at the top except for a removable shipping cover 14. A variable size container 16 is positioned in the box 12 and includes a plurality of telescopically interconnected nesting sections 20 with the bottom section having a bottom wall 22. The top section is substantially closed by a cover 24 having an elongated opening 26 along the longitudinal center line of the container 16 for exposing seeds 28 embedded in a layer of water soluble wax 30 on top of compressed peat moss 32. It is seen in FIG. 3 that the compressed peat moss 32 occupies in the collapsible container 16 only a portion of the total space available in the container 16 when compared with the expanded size of the container.

Each of the telescopic sections 20 include bottom peripheral inwardly extending flanges 40 for engagement with outwardly extending peripheral flanges 42 on the upper end of the next lower section 20.

The flower box 10 is assembled by first placing the compressed peat moss in the telescopic container 16 and applying seeds 28 to the top of the peat moss followed by a heated coating of water soluble wax 30 for securing the seeds 28 to the peat moss during shipment and the like. The cover 24 is then placed on the top telescopic sections 20 followed by the shipping cover 14. Upon arrival at the destination and in preparation for use the shipping cover 14 is removed and discarded and as seen in FIG. 3, water 44 is applied from a faucet or container 46 to the wax 30 which in turn dissolves it and allows it to wash away leaving the seeds 28 which can now germinate and begin growing in the moistened and expanded peat moss 32. The expansion of the peat moss causes the telescopic section 20 to expand to the condition of FIG. 6. Future watering is accomplished by providing water 48 in the watering tray 12. As seen in FIG. 8, plants 50 are produced by the seeds 28 and extend upwardly through the opening 26 in the cover 24.

It is appreciated that the flower box of this invention involves fascinating qualities that are appreciated by the user when water is applied to the opening 26 in the cover 24. The expandable container 16 begins rising before the user's eye for no apparent reason followed by gradual disappearance of the wax 30 which as indicated leaves the seeds 28. The drama continues days later as the plants 50 begin to appear.

In FIG. 9 greater detail of the inside of the container is shown wherein a humidity chamber 52 is seen between the expanded peat moss 32 and the sidewalls of the telescopically interconnected nesting sections 20. In reality the compressed peat moss when expanded by the application of water expands vertically and not laterally significantly thus forming the humidity chamber 52 since the walls flare outwardly from the base upwardly. The arrows 54 indicate air entering the chamber 52 through the joints interconnecting the telescopic sections 20. The air in the chamber 52 is humid due to the moist peat 32 in continuous contact with the standing water 48. Thus the roots 56 of the plants 50 are exposed to air and moisture in the chamber 52. The air contains certain nutrients upon which the plant 50 will feed.

An alternate embodiment of this invention is shown in FIGS. 10-13 with a further modified version being shown in FIG. 14. A watering tray 60 containing standing water 62 received a rectangular in shape container 64 which in turn receives a pot assembly 66. Bottom watering holes 68 are provided in the bottom wall 70 of the container 64 for transmission of water 62 through the watering holes 72 in the bottom wall 74 of the pot assembly 66 to the organic growing medium 76 containing a plant 78. The exterior side and end walls 80 and 82, respectively, of the pot assembly enclosure 66 include air holes 84 throughout their substantial area. Individual pots 86 are formed by divider walls 88 in parallel spaced relationship and define an air chamber 92 therebetween. Individual pots further comprise the transversely extending walls 94 which as seen in FIGS. 10 and 11 are not apertured since air supplied from the chamber 90 on one side of the growing medium 76 is sufficient when taken along with the air supplied from the air chamber 100 between the pot assembly wall and the container wall, as seen in FIG. 12. The pot assembly is sufficiently smaller than the container 64 to provide the air chamber 100 on all sides of the pot assembly. Mating top outwardly extending flanges 102 and 104 are provided on the pot assembly enclosure 66 and the container 64, respectively. Air holes 108 and 110 are provided in the flanges 102 and 104, respectively, for communication between the air chamber 100 and the atmosphere.

The air chamber 92 between the longitudinally extending walls 88 is maintained by the transversely extending walls 94 which interlock through interlocking serrations 112 and 114. The serrations 114 are on opposite sides of any spacer element 116 positioned between the walls 88 and in the chamber 92. The walls 88 are also provided with air openings 118 for communication between the air chamber 92 and the growing medium 76. As seen in FIG. 13, the lower ends of the walls 88 are also received in longitudinally extending grooves 120 to maintain the lower ends of the walls in spaced relationship. The water 62 in the watering tray 60 is maintained in a trough 122 below the apertures 68 in the container bottom wall 70 and also the watering hole 72 in the bottom wall 74 of the pot assembly enclosure 66. To prevent a seal occurring between the bottom wall 74 and 70, the grooves 120 form downwardly extending spacer shoulders 126 to maintain the two bottom walls in spaced relationship, as seen in FIGS. 12 and 13.

Further air may be provided to the individual pots 86 by a pair of walls 94 being provided extending transversely to the walls 88, as seen in FIG. 14, and thereby defining an additional chamber 130 in communication with the adjacent growing mediums 76. It is seen that the plants 78 include roots 132 which grow outwardly in search of air and moisture and nutrients supplied in the air and actually grow through the openings 118 and 84 where they thrive in the humid air chambers 92 and 130 formed by the walls 88 and 94, respectively, along with the air chamber 100 extending around the outside of the pots 86.

A further alternate embodiment is illustrated in FIGS. 15 and 16 and is referred to generally by the reference numeral 140 and includes a watering tray 142 containing water 144 in communication with a plurality of chambers 146 formed by walls 148. The chambers 146 receive individual pots 150 having sidewalls 152 including air openings 154. The pots 150 are smaller than the chambers 146 and thereby form an air chamber 156 around the pots 150. An outwardly extending peripheral flange 158 on the pots 150 rest on the upper edges of the walls 148 to restrict air entering the air chamber 156. Air openings 160 are provided for the admission of air into the chamber 156. The chamber walls 148 are linked together by bridging horizontal portion 162, as seen in FIG. 16. Support and spacer legs 164 maintain the bottoms of the chambers 146 above the bottom wall of the watering tray 142, as seen in FIG. 16.

A plant 164 is provided in the organic growing medium 166 and includes roots 168 in the growing medium which extend outwardly in search of the humid air in the humidity chamber 156, as seen by the root in 170 in the chamber 156. Water from the tray 142 rises in the chamber 156 to the level of the water in the tray and thus maintains the air humid. Water also enters the chamber through bottom watering holes 172 which are also in communication with watering hole 174 in the pot bottom wall 176.

In FIG. 16 a cover 178 is provided over the top of the pot 150 and engages the flanges 158. Through use of this top an additional humid air chamber 180 is provided around a plant stock portion 182 which due to the optimum growing conditions produces roots 184 above the growing medium 166. This is further proof of the desirability of maintaining humid air within reach of the plant root structure since it encourages root growth and thus plant growth.

In FIGS. 17 and 18 a further embodiment is shown and it is referred to generally by the reference numeral 190 and includes a watering tray 192 containing water 194. An outer plant container 196 is provided which is generally square in shape.

An organic growing medium ball 198 containing a plant 200 is positioned in the center of the container 196 in a first chamber 202. A second chamber 204 is defined by a pair of concentric spaced apart walls 206 and this chamber functions as a humidity air chamber. Next, a growing medium chamber 208 is defined by spaced apart walls 206 and 210 and contains the organic growing medium material 198. Again moving concentrically outwardly, another air chamber 212 is defined by spaced apart walls 210 and 214. Lastly, a growing medium chamber 216 is defined by the wall 214 and a wall 218 and an air chamber 220 is provided between the wall 218 and the walls of the container 196. Each of the walls, it is seen, include apertures 222 over their substantial area for transmission of humid air as well as to allow the roots 224 to grow freely outwardly in the growing mediums and air chambers in the pursuit of moist air and nourishment. An aligned series of openings 226 in the center of the series of wall containers transmit water 194 from the tray 192 into each of the chambers to provide moist growing mediums and humid air chambers. Thus it is seen that as the plant grows from a small plant, as seen by the solid lines in FIG. 18, to a large plant, as seen by the dash lines, the root structure is always within reach of fresh moist air. The plant 200 may be referred to as "leapfrogging" from one chamber to the next outwardly concentrix chamber. This structure allows the plant to never have to be transplanted as it can be started out as a seed or a very small plant in a very large container and continue to grow in this container to a large size plant.

As previously indicated, one of the concepts of this invention is that continuous watering of plants may be practiced if air is made available to the growing medium and plant roots. While the air is preferably humid air since the plant will grow more aggressively it may be dry air as indicated in FIG. 22. The growing medium 230 is of organic material in a pot 232 having air openings 234 substantially uniformly distributed over the sidewalls of the pot. No humid air chamber as such is provided in this arrangement. Water 236 from a watering tray 238 is supplied through bottom watering holes 240 in the pot 232. It has been found that the roots 242 will grow outwardly to the openings 234 in the container wall but due to the air being dry will not significantly grow through the container wall openings 234. Continuous watering may be practiced, however.

In FIG. 23 the same arrangement is shown but the container 232A is made of a material such as peat which has substantial porosity to allow air, indicated by the arrows 246, to pass through the walls. Other plastic materials that are sufficiently porous for air transmission may be used.

In FIG. 19 a hothouse 250 is shown which includes a humid air chamber 252 surrounding a plant 254 in a pot 256 having air apertures 258 for transmission of the humid air to the growing medium and also to allow the roots of the plant to grow out of the pot in search of the nutritious and moist air. A continuous watering tray 260 is provided for the pot 256. This arrangement would be used in commercial production of plants. It is understood that the air would transmit through the exterior walls of the hothouse 250.

The organic growing medium used in the various embodiments of this invention is preferably compressed peat moss obtained from Hasselfors Garden, Hasselfors, Sweden.

Lastly, the concepts of this invention are illustrated in field application in FIGS. 20 and 21 wherein the growing medium is soil 270 in which plants 272 are growing. Between the rows of plants 272 are humid air chambers 274 provided by spaced apart walls 276 having a bottom channel portion 278 for holding water 280. The walls 276 above the water 280 include air openings 282 for admission of air from the chamber 274 into the growing medium soil 270 and for the roots 286 to grow outwardly in search of air and moisture. Use of the concepts of this invention in this growing application minimized the wasting of water since it is held adjacent the plants roots and the roots use as much as they need. A water source (not shown) may be connected to the air and water chambers 274.

I claim:

1. A potted growing medium adapted for all seed and plants growing together at the same time which is continuously aerated and watered comprising,
   a pot container having a wall,
   a growing medium in said container, said growing medium being sufficiently porous to allow air to freely circulate therethrough and having properties allowing capillary action to transmit water throughout the growing medium,
   an unregulated water supply in continuous contact with said growing medium fully supplying said growing medium with as much water as it will naturally hold to substantially saturate said growing medium and maintain it in a substantially saturated condition throughout,
   a fresh air source in continuous communication with said growing medium to provide a substantially continuous supply of fresh air throughout said growing medium with said air having been humidified by passing through said saturated growing medium and thereby supplying fresh humidified air to seed or plant roots in the growing medium,
   said container including a plurality of pots in side-by-side spaced relationship and each pot including a growing medium and said container and water supply including standing water in communication with the bottom of each of said growing mediums through openings in the bottom of said pots, and
   said container further including a plurality of side-by-side chambers in which said pots are positioned and each of said pots being smaller than said chamber to provide an air space between said chamber wall and said pot wall with said air source being in communication with said air space and said pot wall having openings in its substantial area for placing said growing medium in communication with said air chamber whereby plant roots have access to humid air.

2. A potted growing medium adapted for all seed and plants growing together at the same time which is continuously aerated and watered comprising,
   a pot container having a wall,
   a growing medium in said container, said growing medium being sufficiently porous to allow air to freely circulate therethrough and having properties allowing capillary action to transmit water throughout the growing medium,
   an unregulated water supply in continuous contact with said growing medium fully supplying said growing medium with as much water as it will naturally hold to substantially saturate said growing medium and maintain it in a substantially saturated condition throughout,
   a fresh air source in continuous communication with said growing medium to provide a substantially continuous supply of fresh air throughout said growing medium with said air having been humidified by passing through said saturated growing medium and thereby supplying fresh humidified air to seed or plant roots in the growing medium,
   said container including a plurality of pots in side-by-side spaced relationship and each pot including a growing medium and said container and water supply including standing water in communication with the bottom of each of said growing mediums through openings in the bottom of said pots, and
   said plurality of pots being included in a pot enclosure having a size smaller than said container to provide an air chamber between said pot enclosure and said container, and a plurality of walls extending across said pot enclosure to form said plurality of pots, and said pot enclosure including air openings over its substantial area to provide communication between said air chamber and each of said pots.

3. The structure of claim 2 wherein said air chamber is in communication with the outside air at the top thereof.

4. The structure of claim 3 wherein said pot enclosure and said container include mating peripheral top flanges to provide a restricted air opening into said air chamber.

5. The structure of claim 2 wherein said plurality of walls include pairs of spaced apart walls having air openings to form an air chamber therebetween and said air chamber being in communication with said air source and the inside of said pots around said growing medium.

* * * * *